United States Patent [19]

Shibata et al.

[11] Patent Number: 4,845,506

[45] Date of Patent: Jul. 4, 1989

[54] ANTENNA SYSTEM

[75] Inventors: Yoshihisa Shibata, Kariya; Hiroshi Mizuno, Nagoya, both of Japan

[73] Assignee: Nippondenso Co., Ltd., Kariya, Japan

[21] Appl. No.: 879,315

[22] Filed: Jun. 27, 1986

[30] Foreign Application Priority Data

Jun. 29, 1985 [JP] Japan .................. 60-143318

[51] Int. Cl.⁴ ............... H01Q 1/32; H01Q 13/20
[52] U.S. Cl. ........................... 343/713; 343/717; 343/770; 343/876; 342/117
[58] Field of Search ........... 343/713, 717, 876, 824, 343/858, 770, 771, 767; 342/115, 117, 373, 374

[56] References Cited

U.S. PATENT DOCUMENTS

| 2,654,842 | 10/1953 | Engelmann | 343/770 |
|---|---|---|---|
| 3,222,677 | 12/1965 | Fink | 343/876 |
| 3,276,019 | 9/1966 | Fackler | 342/374 |
| 3,364,492 | 1/1968 | Griffee | 343/876 |
| 3,371,341 | 2/1968 | Stavis | 343/770 |
| 3,696,433 | 10/1972 | Killion et al. | 343/770 |
| 3,775,771 | 11/1973 | Scherer | 343/770 |
| 4,050,071 | 9/1977 | Clorfeine | 342/117 |
| 4,180,817 | 12/1979 | Sanford | 343/700 MS |
| 4,373,161 | 2/1983 | Matsumura | 343/717 |
| 4,459,593 | 7/1984 | Hall et al. | 343/700 MS |
| 4,594,595 | 6/1986 | Struckman | 343/770 |
| 4,658,257 | 4/1987 | Izutani et al. | 342/374 |

FOREIGN PATENT DOCUMENTS 52-147048 12/1977 Japan.
60-236303 11/1985 Japan.

*Primary Examiner*—Rolf Hille
*Assistant Examiner*—Michael C. Wimer
*Attorney, Agent, or Firm*—Cushman, Darby & Cushman

[57] ABSTRACT

A side-looking array antenna system is disclosed in which the inclination angle of the antenna main beam is determined depending on the intervals of a plurality of antenna elements forming an array. A switch is provided to selectively connect one of the ports of an antenna feeder to a signal source or the like. The switch is used to select one of the ports of the antenna feeder as an excitation port, thereby reversing the direction of inclination of the antenna main beam. The antenna main beam can thus be directed in either of the two directions by the operation of the switch. Also, by using this antenna system, a Doppler radar vehicle speedometer with small calculation error, automotive radar and the like may be simply configured.

12 Claims, 3 Drawing Sheets

ANTENNA SYSTEM

BACKGROUND OF THE INVENTION

1. FIELD OF THE INVENTION

The present invention relates to an antenna system comprising a side-looking array antenna, or more in particular to an antenna system which is capable of spatial beam scanning with a simple construction.

2. DESCRIPTION OF THE RELATED ART

It is often necessary to effect a spatial high speed scanning of an antenna beam for the purpose of receiving an electromagnetic wave from various directions and sending it in various directions such as in an antenna system used for a radar. In such a case, a multiplicity of antenna elements are generally arranged in the same plane to make up an array antenna, and the phases of the electrical signals for sending electromagnetic waves, respectively, supplied to antenna elements are varied according to a predetermined rule thereby to effect an electrical beam scanning in a phased array system. When beam scanning, effected in the phased array or the like, is not provided, on the other hand, a plurality of antennas corresponding to a plurality of desired beam directions are respectively provided and switched for operation.

In the above-mentioned phased array system, the phase of each antenna element is varied, and therefore each antenna element is required to be connected with a phase shifter. This results in an increased connection loss or transmission loss, thereby deteriorating the antenna characteristics. Further, due to the added weight of the phase shifter, generally the whole antenna system becomes heavy and bulky. In an antenna system which does not effect beam scanning, it is necessary to provide as many antennas as the desired number of beam directions. As a result, a great number of antennas are required, thereby posing the problem of connection loss, transmission loss and the weight and bulkiness of the system as in the case of phased array system.

SUMMARY OF THE INVENTION

The object of the present invention is to provide an antenna system in which the number of phase shifters or the number of antennas of the phased array system can be reduced.

According to the present invention, there is provided an antenna system comprising a side-looking array antenna in which an antenna main beam is inclined at an angle depending on the intervals of the antenna elements making up an array, and switching means for connecting a signal source or the like to one or the other of the ports of an antenna power feeder by its switching operation, the switching means being used for switching the ports of the antenna feeder as an excitation port thereby to reverse the direction of inclination of the antenna main beam for scanning space, in which the antenna main beam is capable of being directed in either of two directions by switching operation of the switching means, thereby making it possible to reduce the number of phase shifters or antennas in a phased array.

By utilizing the antenna system according to the present invention, it is possible to realize with a simple construction a transmission-receiving system of beam scanning type, a receiving system, a Doppler radar vehicle speedometer with small calculation error, an automotive radar with a broad detection range, etc.

DESCRIPTION OF THE PREFERRED EMBODIMENTS

Figure 1:
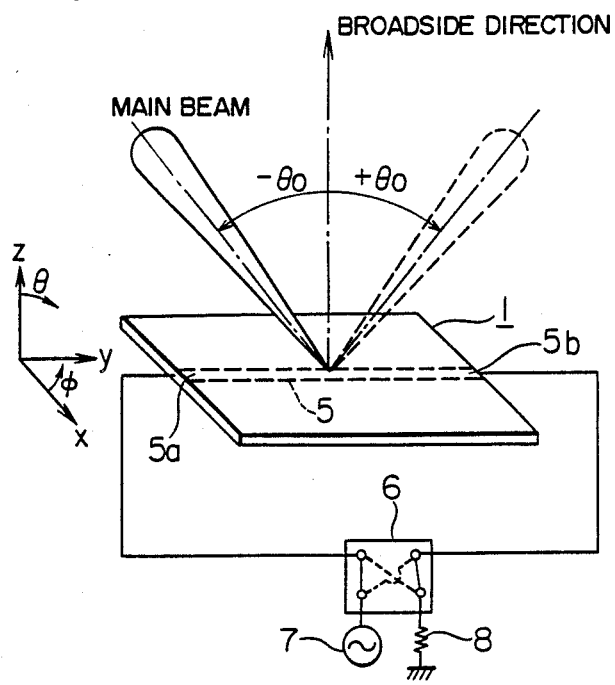
FIG. 1 is a configuration diagram for explaining the basic principle of an antenna system according to the present invention.
Figure 2:
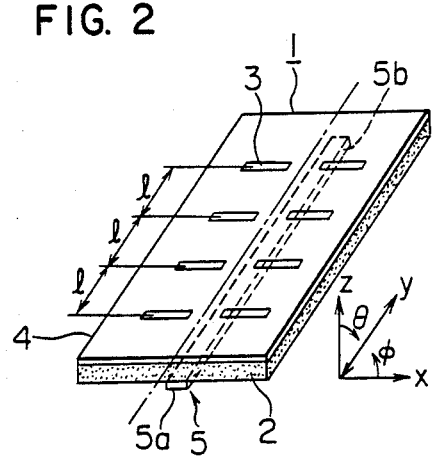
FIG. 2 is a perspective view of a basic embodiment of an antenna system according to the present invention.

FIG. 1 is a configuration diagram showing a basic embodiment of the antenna system according to the present invention. In FIG. 1, reference numeral 1 designates a side-looking array antenna. As shown in FIG. 2, the array antenna 1 includes a dielectric substrate 2 made of Teflon or ceramics, a plurality of slots 3 making up an antenna element in the surface of the dielectric substrate 2, a conductive layer 4 having the slots 3, and a power feeder 5 on the back of the dielectric substrate 2 for supplying power to the slots 3 through the dielectric substrate 2, thereby making up what is called the microstrip slot array antenna. The direction of the main beam used for scanning space in the side-looking array antenna depends on the interval l of the slots 3 arranged along the feeder making up the array of the antenna elements. In this embodiment, the antenna main beam is directed along the direction of $\phi = \pi/2$, $\theta = \theta_0$ in the coordinate system of FIGS. 1 and 2. The interval l is determined in the manner described below. Specifically, if the antenna main beam is placed in the direction of $\phi = \pi/2$, $\theta = \theta_0$, the electric field from the slots 3 is added in the same phase in this direction, and therefore the equation below is established.

$$k_0 l \sin\theta_0 - \beta_g l = 2p\pi (p=0, \pm 1, \pm 2, \ldots)$$

where $k_0 = 2\pi/\lambda_0$ ($\lambda_0$: Free space wavelength)

$\beta_g = 2\pi/\lambda_g$ ($\lambda_g$: Propagation wavelength along strip line)

As a result, l is determined in a manner to satisfy the above-mentioned equation. In FIG. 1, numeral 6 designates a change-over switch for selecting one of the terminals 5a and 5b of the feeder 5 of the array antenna an excitation port. If the terminal 5a is selected as an excitation port, for instance, a signal source 7 is connected to the terminal 5a, and a matching load 8 is connected to the terminal 5b as shown by the solid line in FIG. 1. If the other terminal 5b is selected as an excitation port, on the other hand, the signal source is connected to the terminal 5b, and the matching load 8 is connected to the terminal 5a as shown by the dashed line.

In this configuration, assuming that the terminal 5a of the feeder 5 of the side-looking array antenna 1 is selected as an excitation port by the switch 6, the antenna main beam is placed along the direction of $\phi=\pi/2$, $\theta=-\theta_0$ (shown by the solid line in FIG. 1) in accordance with above-mentioned equation. On the other hand, assuming that the switch 6 is turned to use the other terminal 5b of the feeder 5 as an excitation port, the antenna main beam is placed along the direction of $\phi=\pi/2$, $\theta=\theta_0$ (shown by the dashed line in FIG. 1). In this way, by switching the excitation ports of the feeder 5 by the switch 6, the direction of inclination of the antenna main beam is reversed, thereby attaining substantially the same state as if the array antenna 1 were rotated by 180° within the installation plane. Specifically, it is possible to direct the antenna main beam in either of two different directions using a single array antenna 1, without moving the antenna proper and without phase scanning by a phase shifter. This rotation is effected by switching the signal input ports by the switch 6. For this reason, in spatial scanning of the antenna main beam by the antenna system according to this embodiment, the scanning of substantially one half of the angle is required as compared with the prior art by switching the excitation ports, and therefore the number of phase shifters for phase scanning, the number of antennas are reduced by one half, and the scanning angle is reduced to one half of the scanning angle for a mechanical scanning. At the same time, the connection loss, transmission loss and the weight and size of the antenna system are reduced.

In the aforementioned embodiment, the switch 6 may be operated manually, or alternatively, automatically at high speed by use of a computer or the like. Also, the switch 6 may be realized by a switching element or switching circuit operable at high speed by use of a semiconductor switch or the like as well as a mechanically-constructed switch.

In the aforementioned embodiment, with the increase in the slots 3 providing antenna elements arranged along the feeder 5, the power absorbed into the matching load 8 is reduced greatly. Therefore, the above-mentioned functions are not affected if the matching load 8 is not connected to the terminal of the feeder 5, thereby leaving it open or short.

Further, according to the present invention, the above-described microstrip slot array antenna may be replaced with equal effect by a waveguide slot array antenna or a crank-type microstrip array antenna which satisfies the relationship between l and $\theta_0$.

Figure 3:
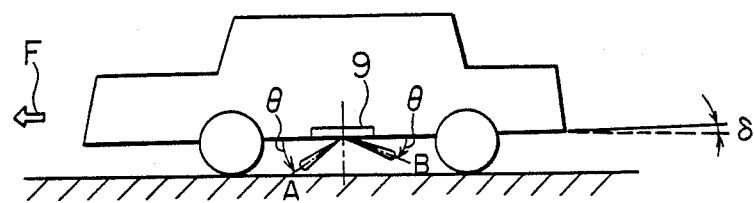
FIG. 3 and FIG. 4 are examples of a vehicle carrying a Doppler speedometer using an antenna system according to the present invention.
Figure 4:
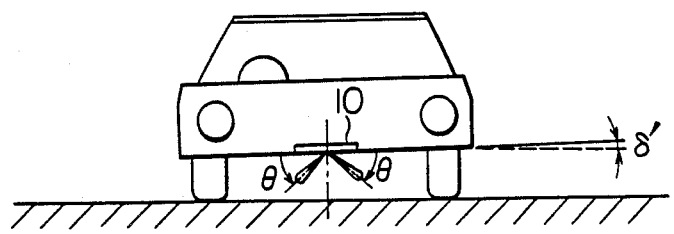

Now, a specific embodiment of the antenna system according to the present invention will be described. FIGS. 3 and 4 show an example of the antenna system according to the present invention applied to an automotive speedometer using the Doppler effect. The antenna system used in this case is the same as the antenna system comprising a transmitter and a receiver as illustrated in FIG. 7.

Figure 5:
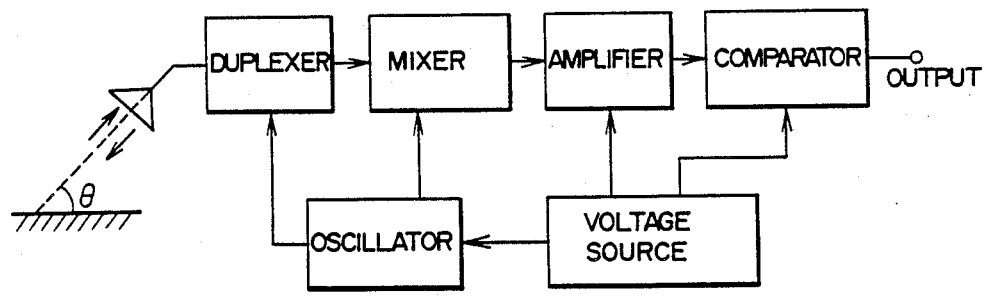
FIG. 5 is a block diagram showing a configuration of the Doppler speedometer.

The Doppler speedometer operates in such a manner that an electromagnetic wave is transmitted from an automotive vehicle toward the road surface along the direction of car travel at a depression angle of $\theta$, and the difference between the transmitting and receiving frequencies thereof, that is, the Doppler frequency, is used to calculate the speed of the vehicle relative to the ground. Generally, this system is configured as shown in FIG. 5. In this Doppler speedometer, when the vehicle body is inclined while running, the propagation angle of the electromagnetic wave to the road surface changes, thereby causing an error in vehicle speed calculation. In order to prevent such an error of vehicle speed calculation due to the inclination of the vehicle body, the Janus configuration in which beams are radiated in two opposite directions is generally used. Specifically, in FIG. 3, when the automotive vehicle is inclined in the longitudinal direction against the travel direction shown by arrow F, the error in the calculation of the vehicle speed attributable to the vehicle inclination angle $\delta$ is reduced by radiating beams at the depression angle $\theta$ in two directions, that is, forward and rearward of vehicle travel (indicated by A and B in the drawing), and by calculating the vehicle speed from the Doppler frequencies for the two directions. In the prior-art configuration of the Doppler radar vehicle speedometer with the Janus configuration, an antenna system is required with antenna beams directed in two predetermined directions, thus necessitating two antennas. According to the antenna system of the present invention, by contrast, the antenna 9 is capable of radiating beams either in the forward or the rearward directions at the depression angle $\theta$ as shown in FIG. 3, and therefore the Janus configuration becomes possible with a single antenna, thereby considerably reducing the error in the calculation of the vehicle speed caused by the vehicle inclination angle $\delta$. Also, if the antenna system 10 according to the present invention is installed in such a manner as to direct the antenna beam leftward and rightward of vehicle travel as shown in FIG. 4, the calculation error of the vehicle speed caused by lateral vehicle inclination angle $\delta'$ against the direction of travel may be reduced.

Figure 6:
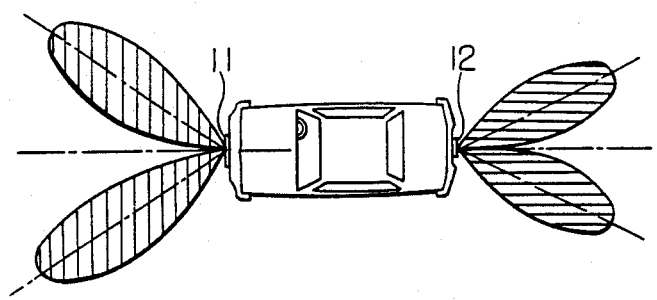
FIG. 6 is a top plan view of an vehicle equipped with an automotive radar using an antenna system according to the present invention.

FIG. 6 shows an antenna system according to the present invention as applied to an automotive radar system. An antenna 11 is installed at the front center of a vehicle, and the antenna main beam is directed rightward or leftward diagonally in the forward direction by operating a changeover switch not shown. In similar fashion, an antenna 12 is installed at the rear center of the vehicle and the antenna main beam thereof is directed rightward or leftward diagonally in rearward direction. In this way, by applying the antenna system of the present invention to the automotive radar, the antenna 11 may be used for leftward or rightward search diagonally in forward direction and the antenna 12 for leftward or rightward search diagonally in rearward direction. As a result, unlike the conventional automotive radar requiring an antenna for each direction of search, the number of antennas is reduced by one half. Although the present embodiment has the antennas 11 and 12 installed at the front and rear centers respectively of the vehicle, the antennas are not necessarily installed at the center, but may be installed at the right or left end at the front and rear parts of the vehicle with equal effect.

Figure 7:
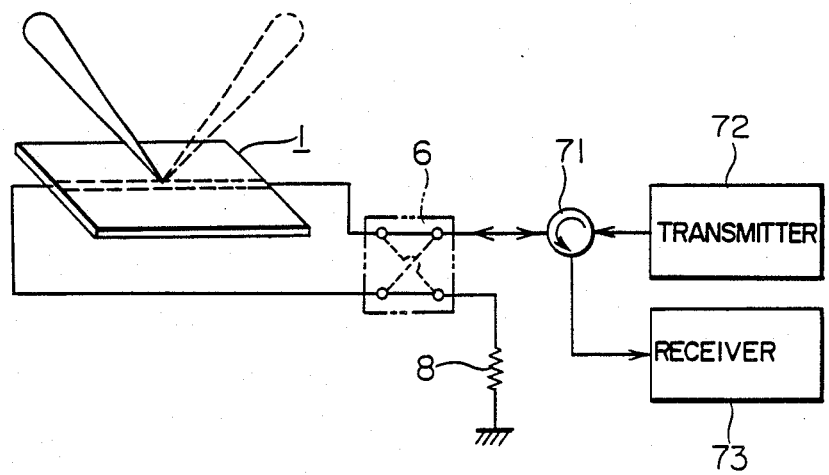
FIG. 7 is a configuration diagram of a transmission-receiving system using an antenna system according to the present invention.

FIG. 7 shows a transmission-receiving system configured by use of an antenna system according to the present invention. In FIG. 7, the same component elements as those in FIG. 1 are designated by the same reference numerals as in FIG. 1 respectively. A switch 6, which is the same as the switch 6 described above with reference to FIG. 2, is connected with a transmitter 72 and a receiver 73 through a circulator 71. A transmission signal produced from the transmitter 72 is applied through the circulator 71 and the switch 6 to the antenna 1 for the purpose of transmission by the antenna. The electromagnetic wave received by the antenna 1 is supplied through the switch 6 and the circulator 71 to the receiver 73. If the switch 6 is configured in the manner described, above in FIG. 2, the directivity of the antenna 1 can be switched, by switching the switch 6 whereby a tranmission/receiving operation in two directions becomes possible.

Figure 8:
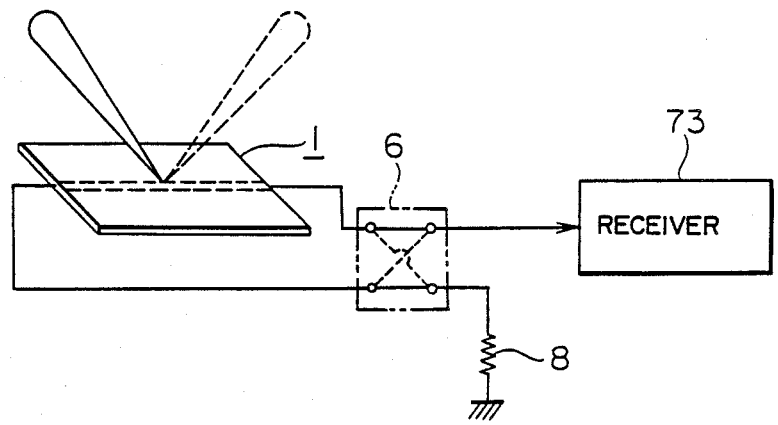
FIG. 8 is a configuration diagram of a receiving system including an antenna system according to the present invention.

FIG. 8 shows a system used only for receiving which is configured of an antenna according to the present invention. In this case, a receiver 73 is connected to the switch 6. In this configuration, the connection of the switch 6 is turned over so that the directivity of the antenna 1 may be switched in two directions, whereby the receiver is capable of receiving the electromagnetic wave from two directions.

The switch 6 in the above-mentioned Doppler vehicle speedometer, vehicle radar, transmission-receiving system and the receiving system may be operated either manually or automatically as already explained. Further, the antenna system according to the present invention may be applied generally to vehicles in addition to the automotive vehicles.

We claim:

1. In a side-looking array antenna system in which an inclination angle of an antenna main beam is determined by spatial intervals of at least four slots as antenna elements arranged in a plane from one side to the other side at the intervals, the antenna elements forming an array antenna, the array antenna including a feeder having terminals at the one side and the other side thereof, respectively, and the array antenna further including a dielectric substrate, a conductive layer formed on a surface of the dielectric substrate, and the four slots formed in the conductive layer at the intervals to constitute the antenna elements, and the feeder is formed on a surface of the substrate opposite to the one having the conductive layer and extends along said antenna elements, and the feeder supplies the power to the slots through the dielectric substrate, the improvement comprising:

switching means coupled between a signal source and the two terminals of the feeder of the array antenna for selectively connecting an output of the signal source to one of the two terminals of the feeder thereby to excite the one of the terminals alternately as an excitation port, thus reversing an inclination direction of the antenna main beam.

2. An antenna system according to claim 1, further comprising a matching load, connected through the switching means to the other terminal of the feeder, the other terminal being one that is not connected with the signal source.

3. In a side-looking array antenna system in which an inclination angle of an antenna main beam is determined by spatial intervals of at least four slots as antenna elements aligned in a plane from one side to the other side at the intervals, the antenna including a feeder having terminals at the one side and the other side, respectively, and the array antenna further including a dielectric substrate, a conductive layer formed on a surface of the dielectric substrate, and the four slots formed in the conductive layer at the intervals to constitute the antenna elements, wherein the feeder is formed on a surface of the substrate opposite to the one having the conductive layer and extends along the antenna elements, and the feeder supplies the power to the slots through the dielectric substrate, the improvement comprising:

switching means coupled between a receiver and the two terminals of a feeder of the array antenna for selectively connecting an input of the receiver to one of the two terminals of the feeder thereby to switch a directively of the antenna main beam.

4. An antenna system according to claim 3, further comprising a matching load connected through the switching means to the other terminal of the feeder not connected with the receiver.

5. In a side-looking array antenna system in which an inclination angle of an antenna main beam is determined by spatial intervals between at least four slots as antenna elements aligned in a plane from one side to the other side at the intervals, the antenna elements forming an array antenna, the array antenna including a feeder having terminals respectively at the one side and the other side, the feeder supplying power to the antenna elements, the improvement comprising:

a circulator, and a transmitter and a receiver connected to a first and a second terminal of the circulator respectively, and switching means arranged between the circulator and two terminals of a feeder of the array antenna for selectively connecting a third terminal of the circulator to one of the two terminals of the feeder thereby to switch a directivity of the antenna main beam, wherein the array antenna includes a dielectric substrate, a conductive layer formed on a surface of the dielectric substrate, and at least four slots formed in the conductive layer at the intervals to constitute at least four antenna elements, and wherein the feeder is formed on a surface of the substrate opposite to the one having the conductive layer and extends along the at least four antenna elements, and the feeder supplies the power to the slots through the dielectric substrate.

6. An antenna system according to claim 5, further comprising a matching load connected through the switching means to the other terminal of the feeder not connected with the third terminal of the circulator.

7. In a Doppler vehicle speedometer comprising an antenna system mounted on an undercarriage of a vehicle from which an electromagnetic wave from a transmitter is radiated toward a road surface and a vehicle speed relative to the ground is calculated in response to the electromagnetic wave reflected from the ground and received by a receiver on the basis of a difference between transmission and receiving frequencies, the improvement in which:

the antenna system is an array antenna system that is fed by a feeder, including switching means for selectively switching a connection relation between one of two terminals of a feeder of the array antenna and the transmitter and receiver, the switching means for switching a radiation of the electromagnetic wave in two directions thereby to reduce errors in calculation of the vehicle speed caused by an inclination of a vehicle body, wherein the array antenna includes a dielectric substrate, a conductive layer formed on a surface of the dielectric substrate, a plurality of slots formed in the conductive layer at predetermined spatial intervals to constitute the plurality of antenna elements, and a feeder formed on a surface of the substrate opposite to the one having the conductive layer and extending along the plurality of antenna elements, the feeder supplying power to the slots through the dielectric substrate.

8. A Doppler radar vehicle speedometer according to claim 7, wherein the electromagnetic wave is radiated in two directions including a direction of vehicle travel and an opposite direction.

9. A Doppler radar vehicle speedometer according to claim 7, wherein the electromagnetic wave is radiated in two directions including leftward and rightward directions laterally of the direction of vehicle travel.

10. A speedometer as in claim 7 wherein said array antenna system includes at least four slots as antenna elements.

11. In a radar for vehicles comprising an antenna system mounted on at least a selected one of front and rear parts of the vehicle, and a signal source, the improvement in which:

the antenna system is a single array antenna system including switching means for selectively switching a connection between one of two terminals of a feeder of the array antenna and the signal source, the switching means for switching a direction of radiation of an electromagnetic wave in either of two directions, the array antenna includes a dielectric substrate, and a plurality of slots formed in the conductive layer at the intervals to constitute the plurality of antenna elements, and a feeder formed on a surface of the substrate opposite to the one having the conductive layer and extending along the plurality of antenna elements, the feeder supplying power to the slots through the dielectric substrate.

12. A radar as in claim 11 wherein said antenna system includes at least four slots as antenna elements.

* * * * *